United States Patent [19]

Sams et al.

[11] Patent Number: 5,575,896
[45] Date of Patent: Nov. 19, 1996

[54] METHOD AND APPARATUS FOR OIL/WATER SEPARATION USING A DUAL ELECTRODE CENTRIFUGAL COALESCER

[75] Inventors: Gary W. Sams, Tulsa; Floyd L. Prestridge, Sapulpa; Merle B. Inman, Tulsa; Dennis K. Manning, Claremore, all of Okla.

[73] Assignee: National Tank Company, Houston, Tex.

[21] Appl. No.: 381,196

[22] Filed: Jan. 31, 1995

Related U.S. Application Data

[63] Continuation-in-part of Ser. No. 223,056, Apr. 6, 1994.
[51] Int. Cl.⁶ .................................................. C10G 33/02
[52] U.S. Cl. .......................... 204/564; 204/563; 204/671
[58] Field of Search .......................... 204/186, 188–191, 204/302, 304, 305, 306, 307, 308, 563, 564, 670, 671

[56] References Cited

U.S. PATENT DOCUMENTS

| | | | |
|---|---|---|---|
| 1,558,382 | 10/1925 | Marx | 204/545 |
| 1,565,997 | 12/1925 | Girvin | 204/669 |
| 2,382,697 | 8/1945 | Deutsch | 204/564 |
| 3,758,399 | 9/1973 | Pendergrass | 204/663 |
| 4,116,790 | 9/1978 | Prestridge | 204/563 |
| 4,341,617 | 7/1982 | King | 204/671 |
| 4,601,834 | 7/1986 | Bailes et al. | 210/748 |
| 4,747,921 | 5/1988 | Bailes et al. | 204/558 |
| 4,801,370 | 1/1989 | Arnesen | 204/667 |

FOREIGN PATENT DOCUMENTS

| | | | |
|---|---|---|---|
| 0617115A1 | 3/1994 | European Pat. Off. | B01D 17/03 |
| WO92/05853 | 4/1992 | WIPO | B01D 17/03 |

*Primary Examiner*—Arun S. Phasge
*Assistant Examiner*—William T. Leader
*Attorney, Agent, or Firm*—Head, Johnson & Kachigian

[57] ABSTRACT

A method and apparatus for augmenting the coalescence of water in a water-in-oil emulsion. The apparatus includes a tubular vessel having a cylindrical side wall and opposed ends. A tangential inlet in the cylindrical side wall is adjacent one of the vessel ends. A tubular electrode having an external diameter less than the internal diameter of the vessel extends concentrically within the vessel from the one end less than the entire length of the vessel. An elongated electrode extends axially and concentrically within the tubular electrode from the one end. An outlet is provided in the one end between the tubular electrode and the elongated electrode. The inlet and outlet serve to cause fluid to initially flow through the vessel in a circumferential path outside the tubular electrode and thereafter axially through the tubular electrode to the outlet. An electrical potential is applied between the electrodes and the vessel.

9 Claims, 4 Drawing Sheets

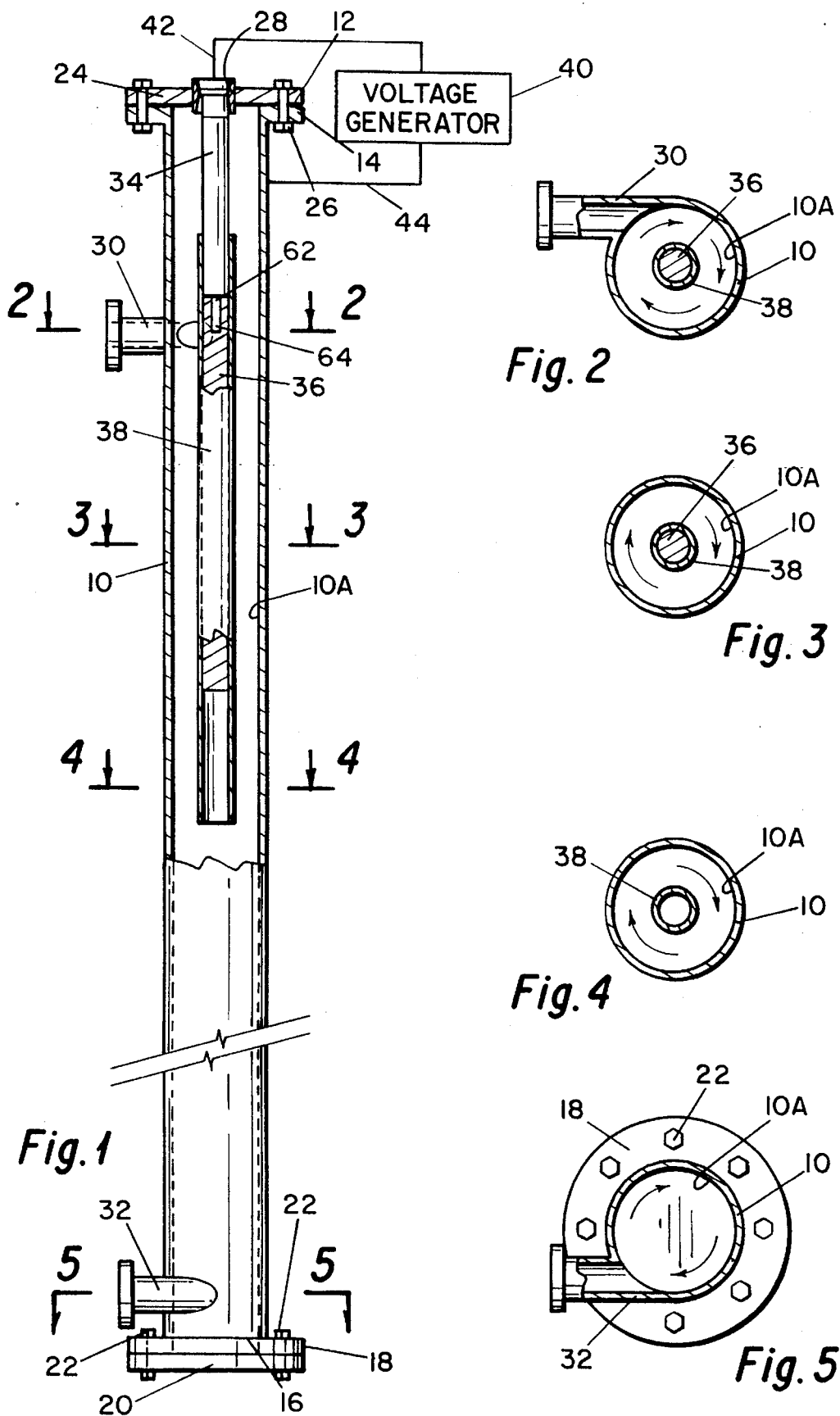

METHOD AND APPARATUS FOR OIL/WATER SEPARATION USING A DUAL ELECTRODE CENTRIFUGAL COALESCER

CROSS-REFERENCE TO RELATED APPLICATIONS

This is a continuation-in-part of application Ser. No. 08/223,056 filed on Apr. 06, 1994.

BACKGROUND OF THE INVENTION

Electrostatic treatment of oil and water has been used by the oil industry for many years to aid in the separation of water from an oil-continuous stream. Treating a water-in-oil emulsion by passing it through a high voltage electrostatic field has been shown to promote rapid coalescence of the water droplets leading to rapid separation. However, this method has traditionally been limited to water contents in the oil up to only about 20%. Electrostatic voltage sources includes AC, DC and combined AC/DC. Attempts to increase the allowable inlet water content have been limited due to the electrically conductive nature of high water content emulsions.

An electrostatic method developed by Dr. Philip Bailes and Steve Larkai of the University of Bradford has proven to successfully treat emulsions with water contents as high as 70% or more. The emulsion must remain oil-continuous with the water finely dispersed throughout. The Bailes/Larkai coalescer solves the high conductivity problem by using two methods, namely an insulated electrode and a pulsed DC voltage field. However, standard vessel designs as commonly used in industry have proven unsatisfactory for the purpose of treating high water content oilfield emulsions operating at high pressures.

For additional background information relating to the basic subject matter of this invention, reference may be had to U.S. Pat. Nos. 4,601,834 and 4,747,921, both of which patents are incorporated herein by reference.

SUMMARY OF THE INVENTION

This invention embodies a coalescer concept in a cylinder using a central insulated electrode.

In one embodiment, water-in-oil emulsion enters the cylinder tangentially through the inlet nozzle located at one end of the cylinder to impart a rotational motion to the fluid. The exit nozzle is installed tangentially at the opposite end of the cylinder to maintain the rotation of the fluid as it anticipates the outlet.

A central electrical conductor acting as the charged electrode is located along the central axis of the cylinder extending along the major portion of the length. An insulating material is specifically chosen to exert the maximum electrostatic field across the emulsion to be processed and extends an appropriate distance above and below the conductive component. The electrode is a smaller cylinder forming an annular cavity between itself and the larger vessel. The electrode is held in place by a high voltage feed through bushing passing high voltage through the vessel head at one end. The emulsion to be treated spirals around the center electrode as it passes along the length of the vessel. Centrifugal forces move the denser, more conductive component of the emulsion (water) away from the charged central electrode, thereby greatly reducing the electrical forces exerted on the insulating material and placing more coalescing force on the emulsion. The insulating effect of the dryer oil around the charged electrode allow the use of thinner insulating material, thus further reducing field losses across the insulator. In some operations, the centrifugal forces will eliminate the need for an insulated electrode.

A high voltage, which may be pulsating, is applied to the electrode as emulsion is spiralling around it. This electrical field promotes coalescence. Specifically, when a pulsating voltage is employed, droplet chains are produced during periods of high voltage followed by rapid coalescence as the electrostatic field collapses. A proper pulse frequency can further enhance the coalescence rate for the water dispersed in the oil. This coalesced water moves to the inner wall of the cylinder due to the centrifugal force applied to the water droplets by the spiralling emulsion. This movement of the bulk of the water away from the electrode reduces the electrical conductivity of the oil adjacent the electrode and allows enhanced treatment of the drier emulsion remaining near the center electrode.

In an alternate embodiment, dual flow of the emulsion is utilized with a pair of concentric electrodes. The water-in-oil emulsion is tangentially injected into a cylindrically walled vessel near one end of the vessel. The emulsion is caused to flow circumferentially within the vessel around a tubular electrode extending from the one end of the vessel. The tubular electrode extends concentrically within the vessel.

An elongated electrode extends axially and concentrically within the tubular electrode. Thereafter, the emulsion is passed axially through the tubular electrode to an outlet in the one end of the vessel between the tubular electrode and the elongated electrode. An electrical potential is applied between the electrodes and the vessel and between each other.

The application of the coalescer of this disclosure has been shown to improve water separation rates by as much as 1250% over conventional gravity separation methods.

A better understanding of the invention can be obtained from the following description of the preferred embodiments, taken in conjunction with the attached drawings.

BRIEF DESCRIPTION OF THE DRAWINGS

FIG. 1 is an elevational view of an apparatus for augmenting the coalescence of water in a water-in-oil emulsion, the apparatus being shown partially broken away. An electrode element used in the apparatus is also partially shown in cross-section.

FIG. 2 is a cross-sectional view of the coalescer taken along the line 2—2 of FIG. 1 showing the tangential fluid inlet.

FIG. 3 is a cross-sectional view of the coalescer taken along the line 3—3 of FIG. 1.

FIG. 4 is a cross-sectional view of the coalescer taken along the line 4—4 of FIG. 1.

FIG. 5 is a cross-sectional view of the coalescer as taken along the line 5—5 of FIG. 1 showing the tangential fluid outlet.

DETAILED DESCRIPTION OF THE PREFERRED EMBODIMENTS

Figures 6, 7:
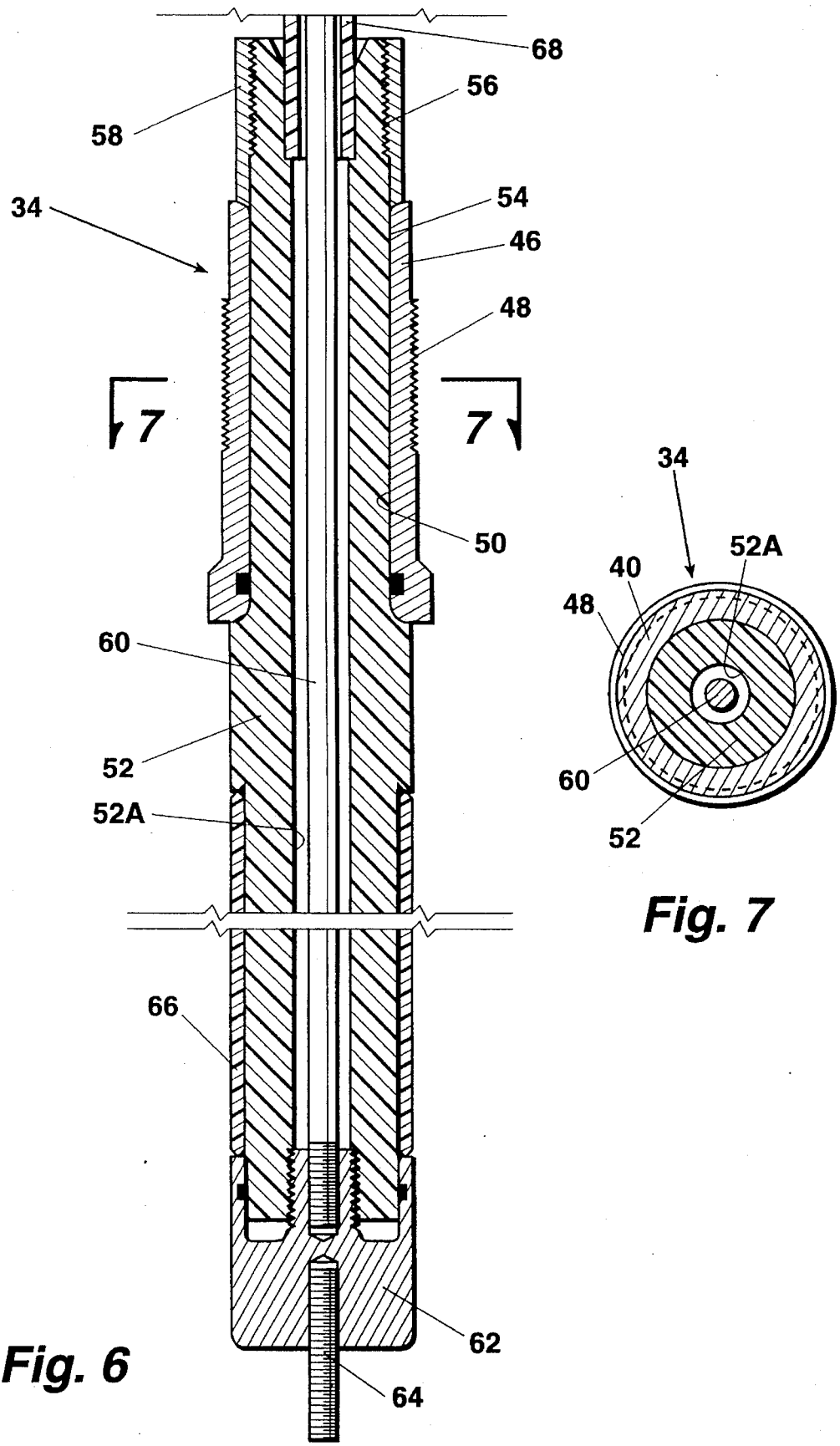
FIG. 6 is an enlarged cross-sectional view of a preferred embodiment of an entrance bushing as used in the coalescer of FIG. 1 and showing how the bushing is mounted in the coalescer tubular vessel.
FIG. 7 is a cross-sectional view of the bushing as taken along the line 7—7 of FIG. 6.

Referring to the drawings and first to FIGS. 1 through 5, the basic structure of the apparatus for augmenting the coalescence of water in a water-in-oil emulsion is shown. An elongated tubular vessel 10 has a top end 12 provided with flange 14 and a bottom end 16 provided with flange 18. A blind flange plate 20 is secured to bottom flange 19 by bolts 22 to close the bottom of the vessel. The top of the vessel has a closure member 24 held to top flange 14 by bolts 26. The closure member 24 has a threaded opening 28 therein.

A tangential fluid inlet 30 communicates with the wall of vessel 10 adjacent top 12. The tangential inlet 30 is configured, as shown in FIG. 2, to cause fluid introduced into the vessel to flow in a circuitous path. A tangential outlet 32 communicates with the vessel wall adjacent bottom end 16. As shown in FIG. 5, tangential outlet 32 augments the circumferential flow of fluid within the vessel since it provides for tangential exit of the fluid as it passes out of the vessel. Tangential inlet 30 and outlet 32 are an important aspect of the invention, since they cause the fluid in the cylindrical vessel to flow in a circumferential, spiralled path. The circumferential flow, as indicated by the arrows in the cross-sectional view of FIGS. 2 through 5, causes centrifugal force to be applied to the fluid moving the heavier component; that is, the water component of the water-in-oil emulsion, towards the vessel interior wall 10A. It also has the effect of retaining the lighter component, that is, the oil component of a water-in-oil emulsion, adjacent the center of the vessel for advantages that will be described substantially.

Received within threaded opening 28 in closure member 24 is bushing 34. Affixed to bushing 34 is an electrode formed of two basic components, that is, a central conductive rod 36 surrounded by an insulator sleeve 38.

Bushing 34 provides means of supporting the electrode formed of conductive rod 36 and insulator sleeve 38 axially within the interior of vessel 10 so that the electrode extends for at least a substantial portion of the length of the vessel. Further, bushing 34 provides means of applying an electrical potential to the electrode conductive rod 36. In FIG. 1, the source of the electrical potential is a voltage generator 40 having a first conductor 42 connected to bushing 34 and a second conductor 44 connected to vessel 10. The nature of the voltage applied between the electrode 36 and vessel 10 will be discussed subsequently.

Referring to FIGS. 6 and 7, an enlarged more detailed view of a preferred embodiment of bushing 34 illustrated. Bushing 34 includes a hub 46 having an enlarged diameter portion which is externally threaded at 48. Threads 48 of hub 46 are received into threaded opening 28 of closure member 24 as described with reference to FIG. 1.

Hub 46 is tubular having an interior surface 50 that receives tubular insulator 52 having an internal tubular opening 52A. Insulator 52 has a reduced diameter portion 54 adjacent its upper end that is received in hub 46. The upper end of reduced diameter portion 54 is externally threaded at 56. Received on thread 56 is a tubular retainer nut 58, the lower end of which engages hub 46 to thereby retain insulator 52 within hub 46.

Received within tubular insulator 52 is a conducting rod 60 made of metal, such as steel, copper or the like. The lower end of rod 60 is threaded to threadably engage a conductive end part 62. All thread stud 64 extends from the end part 62.

Received on the lower portion of insulator 52 is a sleeve of non-conductive material 66. A the upper end of the bushing, a short length sleeve 68, which may be Teflon® tubing, is positioned around rod 60 where it emerges from at the upper end of insulator 52.

FIG. 1 shows bushing 34 in a generalized manner for supporting an insulated electrode 36, 38, whereas FIGS. 6 and 7 show a preferred embodiment of the bushing.

When the bushing of FIGS. 6 and 7 is employed, conductive rod 36 is attached to the bushing end part 62 by means of the all thread screw 64. Thus, bushing 34 of the type shown in FIGS. 6 and 7 supports conductive rod 36 surrounded by an insulated sleeve 38 to extend a substantial portion of the length of the vessel 10, as previously described.

FIGS. 6 and 7 are exemplary of a preferred type of bushing that may be employed in supporting the insulated electrode centrally within the vessel.

Voltage generator 40 preferably is the type that generates pulsating DC voltage in a manner as described in U.S. Pat. No. 4,601,834. As described in this patent, as a pulsating DC voltage is supplied, water components of a water-in-oil emulsion having finely dispersed droplets are caused to coalesce, that is, to join together to form droplet chains during periods of high voltage. During subsequent periods of reduced or no voltage, the droplet chains coalesce, that is, merge together to form larger drops of water. By this coalescing action, the water component of the water-in-oil emulsion is consolidated in larger droplets which respond to gravitational and centrifugal separation. Thus, the device of FIG. 1 is utilized in advance of a gravitational or centrifugal separation vessel (not shown) to augment the separation of water from the emulsion.

Figure 8:
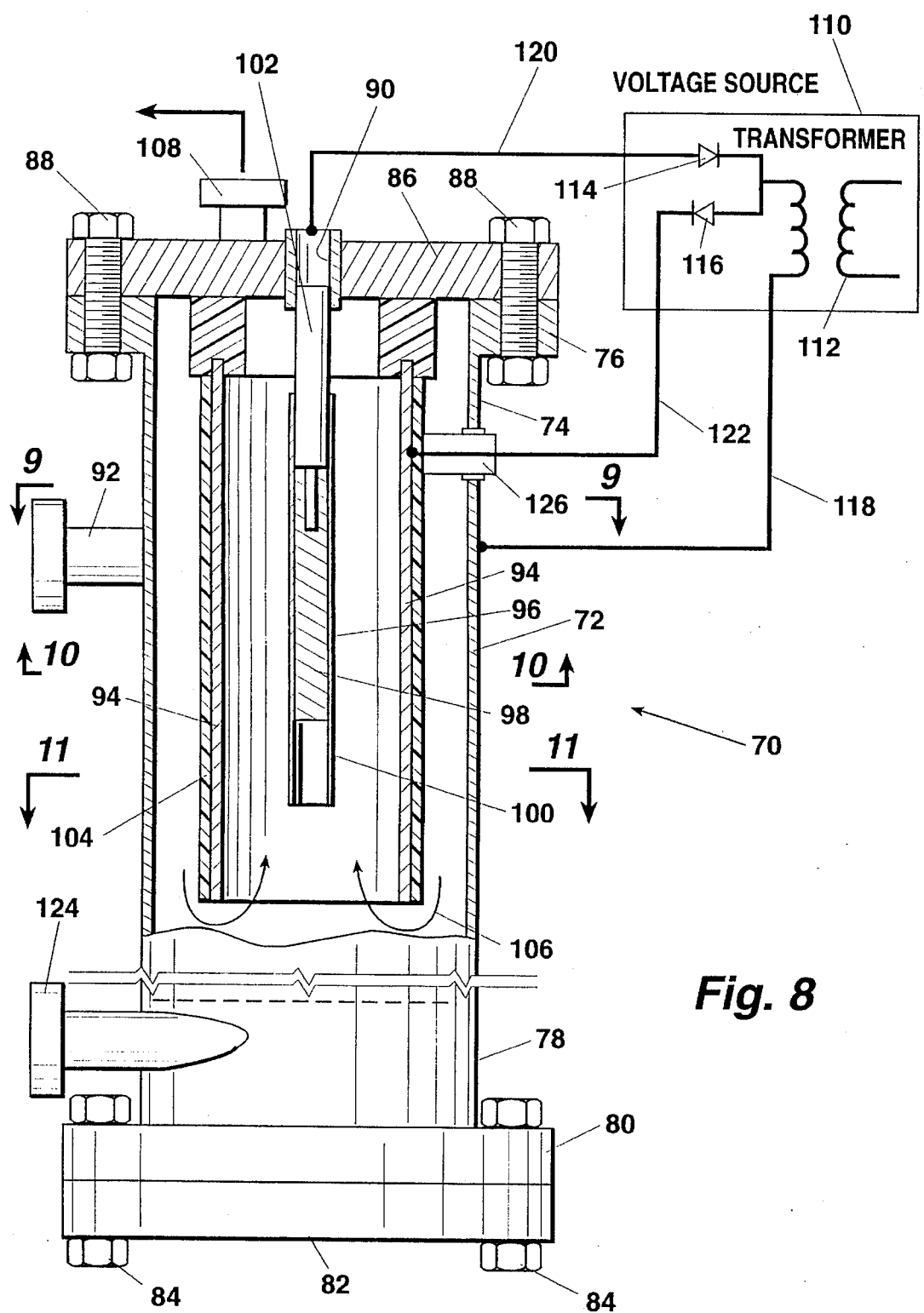
FIG. 8 is an elevational view of an alternate embodiment of the apparatus for augmenting the coalescence of water in a water-in-oil emulsion shown partially cut away.

FIGS. 8, 9, 10 and 11 illustrate an alternate embodiment 70 of the apparatus and method for augmenting coalescence of water in a water-in-oil emulsion. FIG. 8 illustrates an elevational view of the alternate embodiment 70 being partially cut away for clarity. An elongated cylindrical vessel 72 has a pair of opposed ends—a top end 74 provided with radially extending flange 76 and a bottom end 78 provided with radially extending flange 80. A flange plate 82 is secured to the bottom end 78 by fasteners 84 to form a fluid tight seal at the bottom end 78 of the vessel 72. A top closure member 86 is held to the top flange 76 by fasteners 88 to form a fluid tight seal at the top end 74 of the vessel 72. The top closure member 86 has a threaded opening 90 therein.

A tangential fluid inlet 92 communicates through the wall of the cylindrical vessel 72 adjacent the top end 74. Emulsion fluid introduced into the vessel is thus caused to flow in a circuitous path. The flow of fluid moves around the exterior of a tubular, conductive electrode 94 (seen in cross-section). The tubular electrode 94 is concentrically and axially aligned with the cylindrical vessel 72. The fluid flows in the vessel in a circumferential spiral path and will also move axially toward the bottom end 78.

The tubular electrode 94 extends concentrically from the top end 74 from the top closure member 86 toward the bottom end 78. It will be observed that the tubular electrode 94 does not extend the entire length of the vessel to the bottom end 78. The fluid, thus, initially circulates in the space between the exterior of the tubular electrode 94 and the interior of the cylindrical vessel 72 as seen in the sectional view in FIG. 9. Arrows 95 show the circumferential movement of the fluid. The metal tubular electrode is surrounded by insulation 104 on the outside only.

An elongated, conductive electrode 96 extends concentrically and axially from the top closure member 86 within the tubular electrode 94. The elongated electrode 96 includes a central conductive rod or pole 98 surrounded by an insulator sleeve 100. The use of insulator sleeve 100 is optional depending on the water content of the incoming water-in-oil emulsion and the degree of coalescence in the outer annular area.

As previously described, the circumferential flow causes centrifugal force to be applied to the fluid, moving the heavier water component of the emulsion toward the wall of the cylindrical vessel. The lighter oil component is retained adjacent the tubular electrode 94.

As best illustrated by arrows 106, in FIG. 8, once the fluid has travelled a circular path around the exterior of the tubular electrode and moved to the bottom end 78 of the vessel 72, the fluid will reverse direction, as shown by arrows 106, and move axially within the tubular electrode 94 toward the top end.

A fluid outlet 108 communicates with the vessel 72 through the top closure member 86 between the tubular electrode 94 and the elongated electrode 96. Accordingly, after the fluid has moved from the bottom end 70 to the top end 74, it will be removed from the apparatus 70 through the outlet.

Received within the threaded opening 90 in the closure member 86 is a bushing 102 which supports the electrode 96 within the vessel and provides a means to apply an electrical potential to the elongated electrode 96.

An electrical potential is applied both to the tubular electrode 94 and the elongated electrode 96.

A voltage source, such as shown in 110, may include a transformer 112 and diodes 114 and 116. A first conductor 118 is connected to the cylindrical vessel 72 while a pair of second conductors 120 and 122 are connected to the tubular electrode 94 and the elongated electrode 96, respectively. Conductor 122 may pass through bushing 126 in the side wall of the vessel.

Voltage source 110 may generate a pulsating DC voltage. Water components in the water-in-oil emulsion having finely dispersed droplets are caused to coalesce or join together to form droplet chains during periods of high voltage. During subsequent periods of reduced voltage, the droplet chains coalesce and merge together to form larger droplets of water. By this coalescing action, the water component of the water-in-oil emulsion is consolidated in larger water droplets which respond to gravitational and centrifugal separation. It will thus be seen that the alternate embodiment 70 may be used in advance of a gravitational or centrifugal separation vessel to augment the separation of water from the emulsion.

Figure 9:
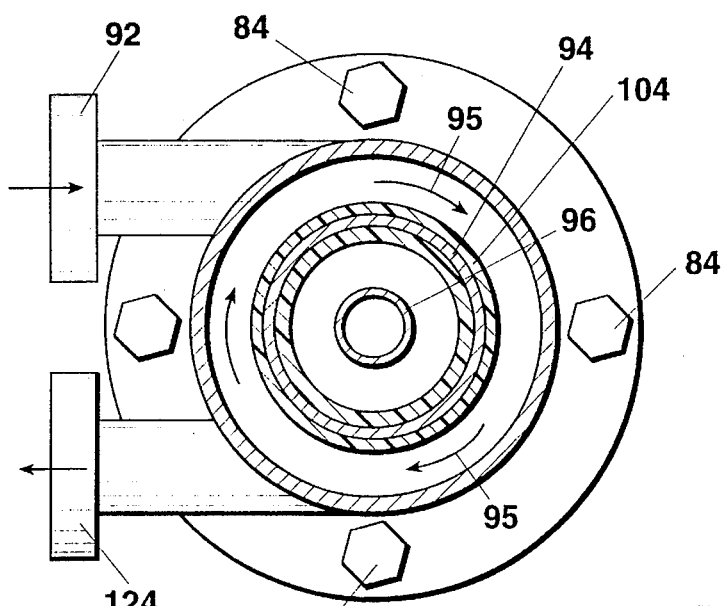
FIG. 9 is a sectional view of the apparatus taken along section line 9—9 of FIG. 8.
Figure 10:
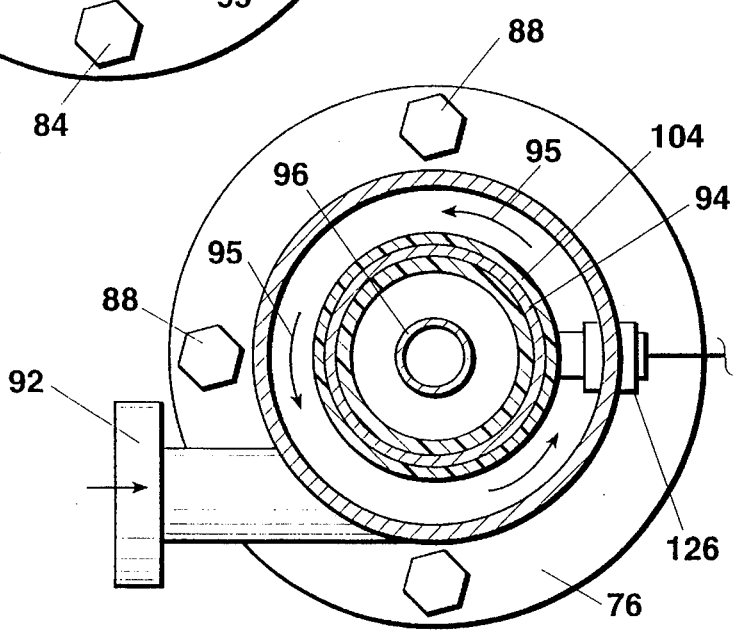
FIG. 10 is a sectional view of the apparatus taken along section line 10—10 of FIG. 8.
Figure 11:
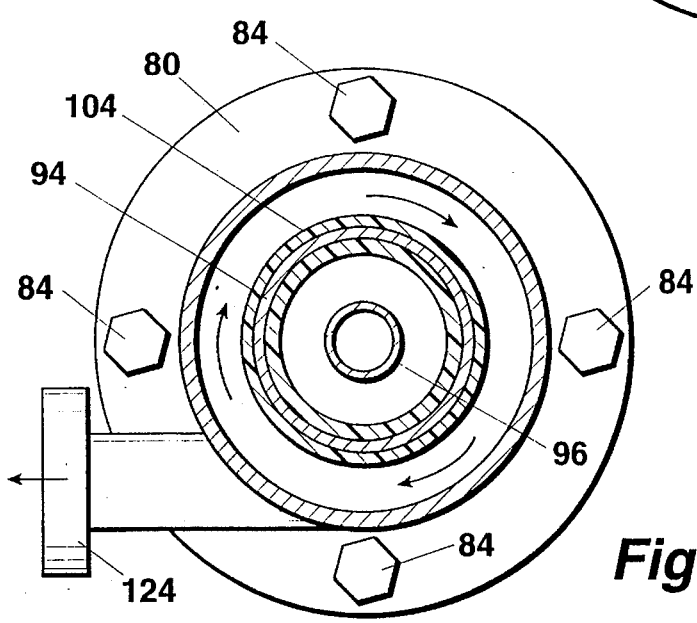
FIG. 11 is a sectional view of the apparatus taken along section line 11—11 of FIG. 8.

As seen in FIG. 8, as well as in FIGS. 9 and 11, an optional drain 124 may be included near the bottom end 78 of the vessel to draw off water accumulation.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of component without departing from the spirit and scope of the disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for augmenting the coalescence of water in a water-in-oil emulsion, which apparatus comprises:

a tubular vessel having a cylindrical sidewall and opposed ends, the cylindrical sidewall having a cylindrical interior surface;

an inlet in said vessel cylindrical sidewall adjacent one of said vessel ends, the inlet communicating tangentially with said vessel cylindrical interior surface;

a tubular electrode of external diameter less than the internal diameter of said vessel, said tubular electrode extending concentrically within said vessel from said one end and being of length less than the length of said vessel;

an elongated electrode extending axially and concentrically within said tubular electrode from said one end;

an outlet in said vessel one end between said tubular electrode and said elongated electrode, said inlet and said outlet serving to cause fluid to flow initially through said vessel in a circumferential path outside said tubular electrode and thereafter axially through said tubular electrode toward said outlet;

means for insulating said vessel, said tubular electrode and said elongated electrode from each other; and means for applying a first electrical potential between said tubular electrode and said vessel and a second electrical potential between said elongated electrode and said vessel.

2. An apparatus for augmenting the coalescence of water in a water-in-oil emulsion as set forth in claim 1 including a drain adjacent to the other said vessel end for draining accumulated water.

3. An apparatus for augmenting the coalescence of water in a water-in-oil emulsion as set forth in claim 1 including an insulator surrounding said tubular electrode.

4. An apparatus for augmenting the coalescence of water in a water-in-oil emulsion as set forth in claim 1 including an insulating sleeve surrounding said elongated electrode.

5. An apparatus for augmenting the coalescence of water in a water-in-oil emulsion as set forth in claim 1 wherein said one end of said vessel has secured thereto a closure having an opening therein concentric with said tubular vessel, said opening for receiving said elongated electrode.

6. A method of augmenting the coalescence of water in a water-in-oil emulsion comprising:

tangentially injecting said emulsion into a cylindrically walled electrically conductive vessel having a cylindrical interior surface and opposed ends near one end to cause the emulsion to flow circumferentially within the vessel around the exterior of a substantially cylindrical tubular electrode extending concentrically within said vessel to thereby cause the water component of the emulsion to migrate towards the vessel's cylindrical interior surface and to maintain a higher percentage of oil component within the vessel interior;

thereafter passing said emulsion axially through an annular area provided between the interior of said tubular electrode and the exterior of an elongated electrode extending concentrically within said tubular electrode, the vessel, the tubular electrode and the elongated electrode being electrically insulated from each other, the emulsion flowing to an outlet in said one end of said vessel within said tubular electrode;

imposing a first electrical potential between said tubular electrode and said vessel and thereby across the emulsion flowing within said vessel; and imposing a second electrical potential between said elongated electrode and said vessel and thereby across the emulsion flowing between said elongated electrode and said tubular electrode.

7. A method of augmenting the coalescence of water in a water-in-oil emulsion as set forth in claim 6 further including the additional step of draining accumulated water from said vessel at the opposite end.

8. A method of augmenting the coalescence of water in a water-in-oil emulsion according to claim 6 wherein said first and second electrical potentials have pulsating DC voltages of opposite polarities.

9. A method of augmenting the coalescence of water in a water-in-oil emulsion according to claim 8 wherein said first and second electrical potentials are of substantially equal magnitudes.

* * * * *